(No Model.)

E. H. HICKERSON.
HARROW.

No. 368,288. Patented Aug. 16, 1887.

Witnesses.
Van Buren Hillyard,
S. Specht

Inventor.
Eli H. Hickerson
By R. S. & A. P. Lacey
Attys

UNITED STATES PATENT OFFICE.

ELI H. HICKERSON, OF RUSH CITY, MINNESOTA.

HARROW.

SPECIFICATION forming part of Letters Patent No. 368,288, dated August 16, 1887.

Application filed May 21, 1887. Serial No. 238,953. (No model.)

*To all whom it may concern:*

Be it known that I, ELI H. HICKERSON, a citizen of the United States, residing at Rush City, in the county of Chisago and State of Minnesota, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a combined cultivator, clod-crusher, and land-marker, and has for its object to produce a simple, convenient, and efficient means for attaining the desired results in a convenient, expeditious, and practical manner; and to that end the improvement consists in the novel construction and combination of parts, which will be more fully hereinafter set forth, and pointed out in the claims, and shown in the annexed drawings, in which—

Figure 1:
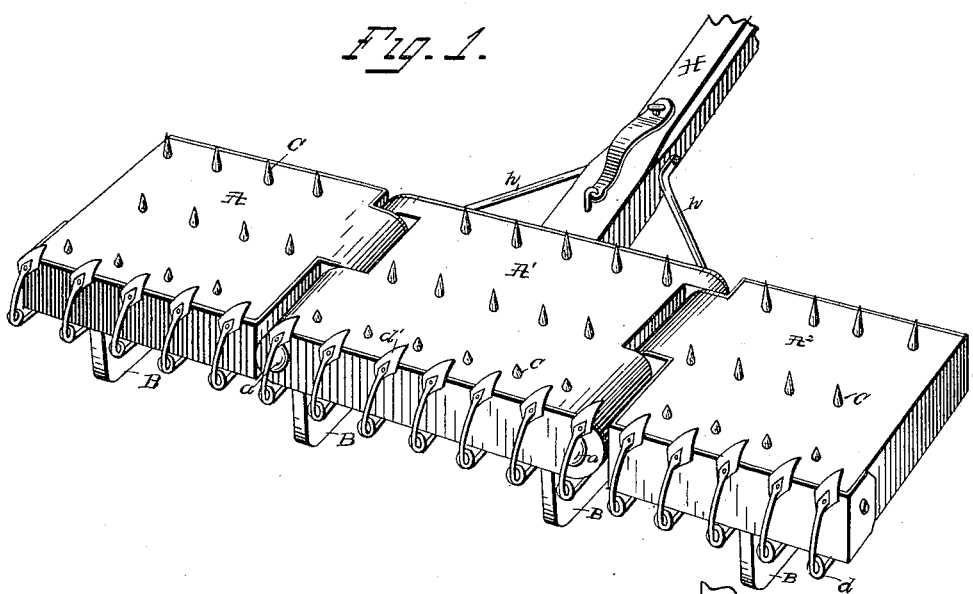
Figure 2:
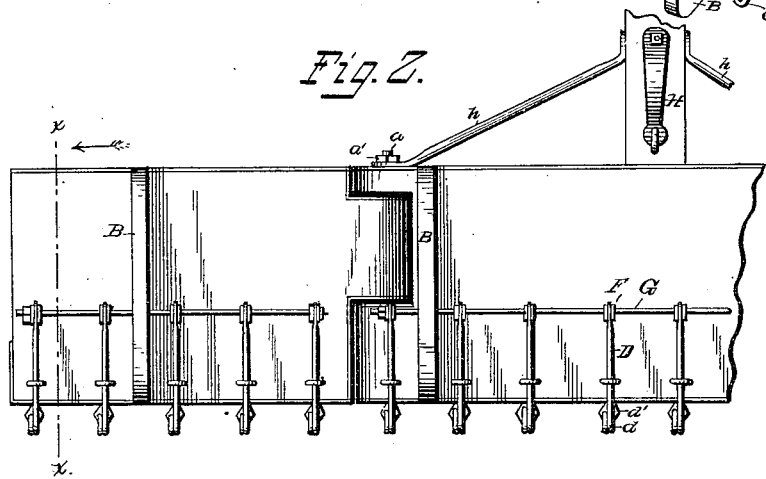
Figure 3:
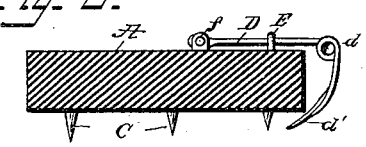

Figure 1 is a perspective view of the device embodying my invention, showing it used as a land-marker; Fig. 2, a plan view, having the land-marker side up, of a portion of the middle section and the end section hinged thereto; Fig. 3, a cross-section on the line X X of Fig. 2, looking in the direction of the arrow.

The improvement is composed of a number of sections, A, A', and A², which are hinged together by providing the approximate end of one section with a tongue which fits into a corresponding recess in the approximate end of the adjacent section and uniting the ends by the bolts $a$. The sections are provided on one side with harrow-teeth C, and on the opposite side with the land-marker and the cultivator-teeth, which extend down over the rear edge of the sections and terminate about on a level with the ends of the harrow-teeth. The cultivator-teeth are composed of a shank, D, having the spring-coil $d$ at its point of flection, and the blade $d'$ secured to the lower end of the shank. The horizontal portion of the shank passes through an eyebolt, E, near the rear edge of the sections, and the forward end, which is provided with an eye, is fitted between the vertical extensions $f$ of the clip-bolt F, located in advance of the eyebolt. Each section is provided with a series of the spring cultivator-teeth, and the rear ends are connected with the clip-bolts F by the rod G.

The pole or tongue H is secured to the middle section, and is braced by the stays $h$, which have their inner ends passed over bolts $a$, and held thereto by the nuts $a'$, screwed on the bolts in the front of the ends of the stays.

Having thus described my invention, what I claim, and desire to secure by Letters Patent, is—

1. The herein shown and described agricultural implement, composed of a series of sections hinged together by having the end of one section made with a tongue which fits in a corresponding recess in the approximate end of the adjacent section, and having a bolt passed through said tongue and the portions of the section on each side of said recess, the land-markers on one side of the sections, the harrow-teeth on the opposite side thereof, and the spring cultivator-teeth operating on the side with the harrow-teeth, and extending up over the edge of the sections and secured to that side carrying the land-markers, substantially as specified.

2. The herein shown and described agricultural implement, composed of a series of sections hinged together, harrow-teeth on one side and land-markers on the opposite side of the sections, harrow-teeth composed of a shank having a spring-coil and an eye at its inner end, the clip-bolts and the eyebolts, and the rods, one for each section, passing through the eyes of the shanks and the eyes of the eyebolts of each section, substantially as and for the purpose described.

In testimony whereof I affix my signature in presence of two witnesses.

ELI H. HICKERSON.

Witnesses:
 H. P. ROBIE,
 W. L. ROWE.